US012523537B2

(12) United States Patent
Al-Helal et al.

(10) Patent No.: US 12,523,537 B2
(45) Date of Patent: Jan. 13, 2026

(54) REMOVABLE SENSORS SYSTEM WITH COLOR INDICATOR FOR TEMPERATURE MONITORING

(71) Applicant: SAUDI ARABIAN OIL COMPANY, Dhahran (SA)

(72) Inventors: Zakariya S. Al-Helal, Dhahran (SA); Ali H. Al-Nashmi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 231 days.

(21) Appl. No.: 18/448,653

(22) Filed: Aug. 11, 2023

(65) Prior Publication Data
US 2025/0052622 A1 Feb. 13, 2025

(51) Int. Cl.
G01K 1/02 (2021.01)
G01K 1/024 (2021.01)
G01K 1/143 (2021.01)
G01K 11/12 (2021.01)
G08B 21/18 (2006.01)

(52) U.S. Cl.
CPC ............ G01K 1/026 (2013.01); G01K 1/024 (2013.01); G01K 1/143 (2013.01); G01K 11/12 (2013.01); G08B 21/182 (2013.01)

(58) Field of Classification Search
CPC .................................................... G01K 1/026
See application file for complete search history.

(56) References Cited

U.S. PATENT DOCUMENTS 4,349,282 A * 9/1982 Norfolk ................. G01K 11/12
  374/E11.018
4,773,350 A * 9/1988 Lyons .................... G01K 13/00
  374/161

(Continued)

FOREIGN PATENT DOCUMENTS

KR    20220075516 A    6/2022

OTHER PUBLICATIONS

Electronic News s.r.l., "Linear System STC"; <http://www.elenews.com/EN_DC_pdf/EN_STC-EN.pdf>; Accessed Aug. 10, 2023 (16 pages).

(Continued)

Primary Examiner — Travis R Hunnings
(74) Attorney, Agent, or Firm — Osha Bergman Watanabe & Burton LLP

(57) ABSTRACT

A system for monitoring, in real time, properties of an object and an environment proximate to the object includes a flexible covering, a plurality of sensors, a control module, and a display. The flexible covering is configured to conform to one or more surfaces of the object. The plurality of sensors are disposed at regular intervals across the flexible covering. Each of the sensors is configured to measure one or more properties. The sensors are configured to transmit property data amongst each other. The control module is configured to receive the property data from each of the plurality of sensors. The control module includes a processor and a non-transitory computer-readable medium having executable instructions encoded thereon such that, when executed, cause the processor to produce a visual representation of the property data. The display is configured to show the visual representation of the property data.

18 Claims, 9 Drawing Sheets

(56) References Cited

U.S. PATENT DOCUMENTS

| | | | |
|---|---|---|---|
| 2007/0146149 A1* | 6/2007 | Abe | G01N 25/18 |
| | | | 340/622 |
| 2014/0334517 A1 | 11/2014 | Blundell et al. | |
| 2018/0328790 A1 | 11/2018 | Osaka et al. | |
| 2020/0071655 A1* | 3/2020 | Palmaz | C12M 23/42 |
| 2020/0128383 A1* | 4/2020 | Maier | B63B 45/00 |
| 2020/0292208 A1* | 9/2020 | Lesage | F24H 15/37 |
| 2020/0375532 A1* | 12/2020 | Nath | A61B 5/6803 |
| 2022/0260432 A1* | 8/2022 | Leibig | G01K 1/18 |
| 2023/0196261 A1* | 6/2023 | Lawler, Jr. | G06Q 10/0832 |
| | | | 705/333 |
| 2023/0334188 A1* | 10/2023 | Wodrich | G06Q 99/00 |
| 2024/0344716 A1* | 10/2024 | Armstrong | F24H 9/2007 |
| 2025/0109996 A1* | 4/2025 | Saravanan | G16Y 40/10 |

OTHER PUBLICATIONS

International Search Report and Written Opinion issued in corresponding International Application No. PCT/US2024/041271, dated Nov. 21, 2024 (26 pages).

\* cited by examiner

REMOVABLE SENSORS SYSTEM WITH COLOR INDICATOR FOR TEMPERATURE MONITORING

BACKGROUND

The external surface temperature of equipment used in processing facilities such as refineries, power plants, and petrochemical complexes must be closely monitored to avoid potential accidents due to equipment failure. This is particularly evident for fired equipment such as heaters, furnaces, reactors, incinerators, vaporizers, steam generators, boilers, and other processing equipment in which the combustion of fuels takes place. A failure in the refractory that protects the shell of fired equipment can result in a sudden increase in temperature, compromising the integrity of the equipment and creating the potential for safety hazards, disruption in operations, and financial losses.

To avoid these risks, several practices are currently being used in the field to monitor the external surface temperature of fired equipment. Infra-red (IR) cameras 10, such as those seen in FIG. 1, can be used to monitor surface temperature. They can be hand-held or fixed, and they provide quick, accurate, and wide surface readings.

A thermocouple can also be used to measure the temperature of fired equipment 20, as seen in FIGS. 2A and 2B. Thermocouples are typically segmented, wire-based, and welded to the equipment to keep them in place. Thermocouples can provide continuous temperature readings over a selected surface area and can be installed beneath the equipment shroud.

Another method used across a facility 30 to monitor the surface temperature of fired equipment 32, 34 is thermochromatic paint, shown in FIG. 3, which is formulated to change color when a temperature threshold is breached. The paint is applied onto the equipment surface 32, 34 and then visually monitored to detect any potential failures due to temperature spikes.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system for monitoring properties of an object and an environment proximate to the object, comprising: a flexible covering configured to conform to one or more surfaces of the object; a plurality of sensors disposed at regular intervals across the flexible covering, wherein each of the sensors is configured to measure, in real time, one or more properties, and wherein the sensors are configured to transmit property data amongst each other; a control module configured to receive, in real time, the property data from each of the plurality of sensors, wherein the control module comprises a processor and a non-transitory computer-readable medium having executable instructions encoded thereon such that, when executed, cause the processor to produce, in real time, a visual representation of the property data; and a display configured to show, in real time, the visual representation of the property data.

In one aspect, embodiments disclosed herein relate to a method for monitoring properties of an object and an environment proximate to the object, comprising: disposing a plurality of sensors at regular intervals across a flexible covering, wherein each of the sensors is configured to measure, in real time, one or more properties, and wherein the sensors are configured to transmit property data amongst each other; positioning the flexible covering on the object, wherein the flexible covering is configured to conform to one or more surfaces of the object; receiving, by a control module comprising a processor, the property data, in real time, from each of the plurality of sensors; producing, in real time, a visual representation of the property data; and displaying, in real time, the visual representation of the property data.

Other aspects and advantages of the claimed subject matter will be apparent from the following description and the appended claims.

BRIEF DESCRIPTION OF DRAWINGS

Specific embodiments of the disclosed technology will be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

Figure 1:
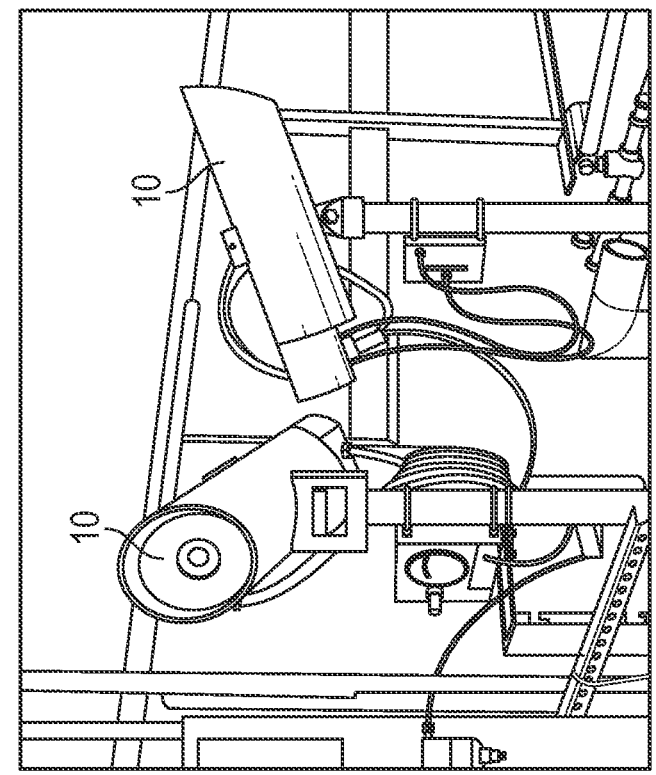
FIG. 1 is an illustration of IR cameras being used to monitor the external surface temperature of equipment.
Figure 1:
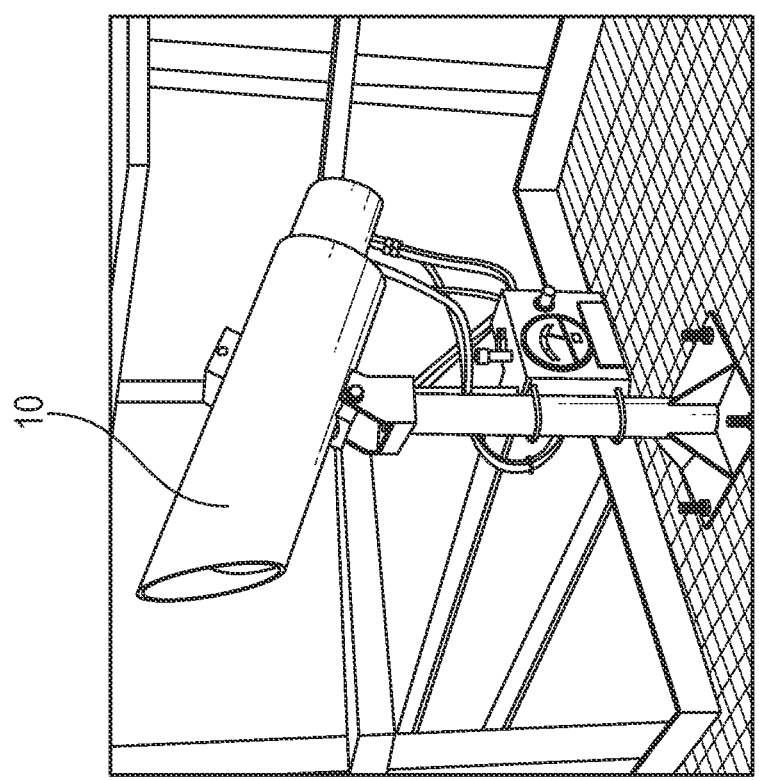
Figure 2A:
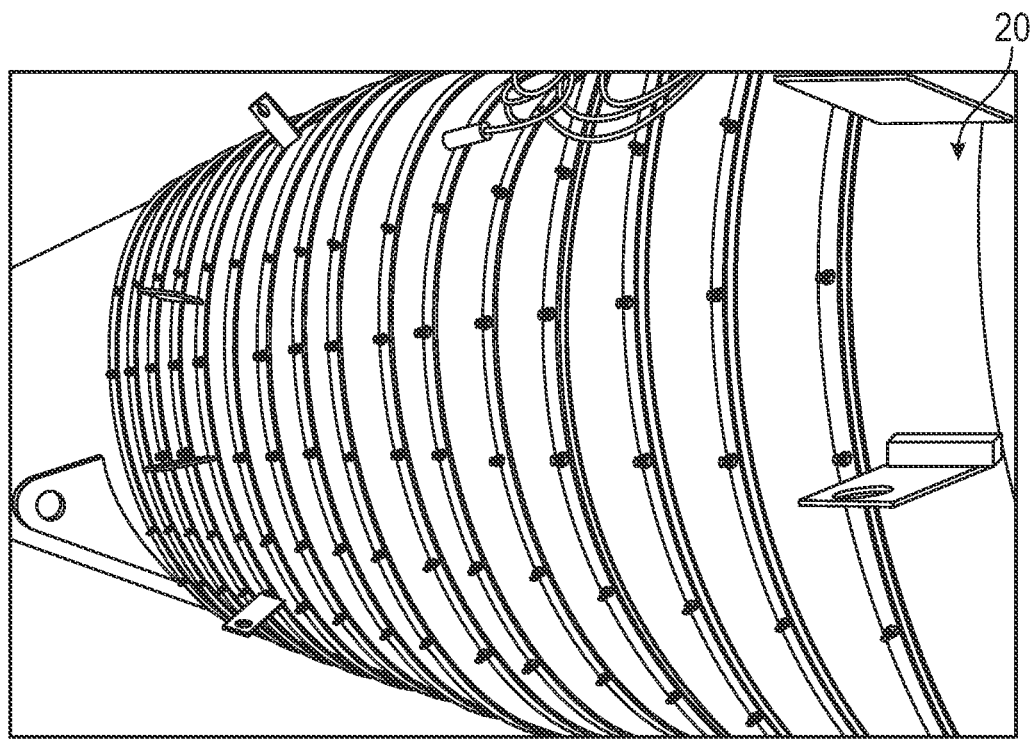
FIGS. 2A-2B are illustrations of thermocouples being used to monitor the temperature of equipment.
Figure 2B:
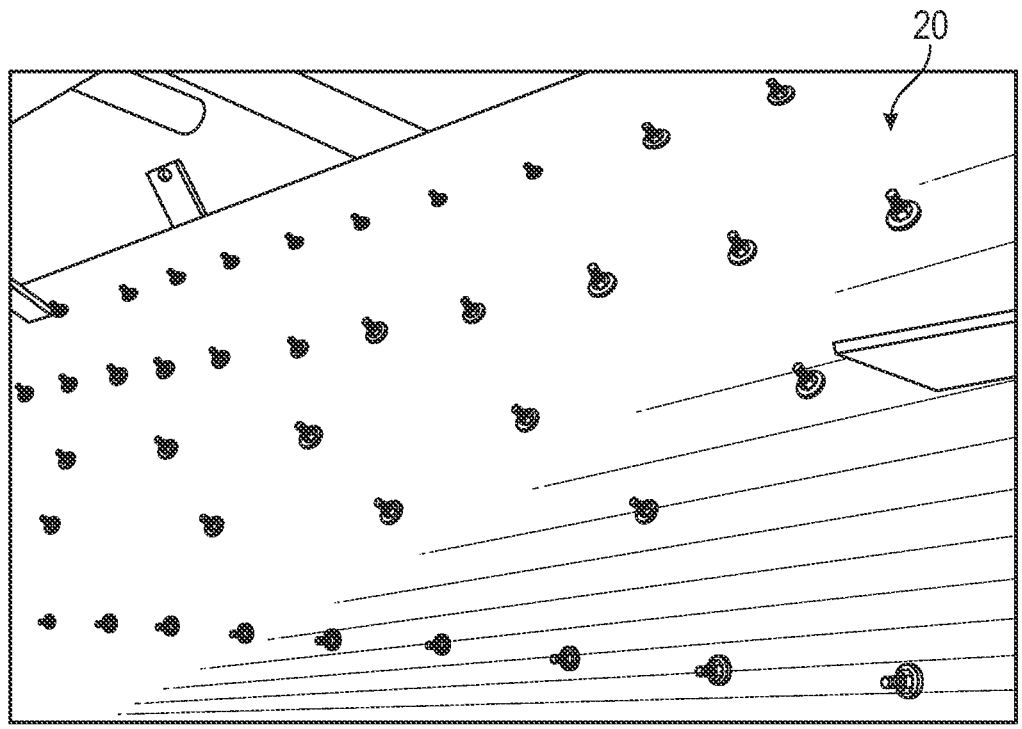
Figure 3:
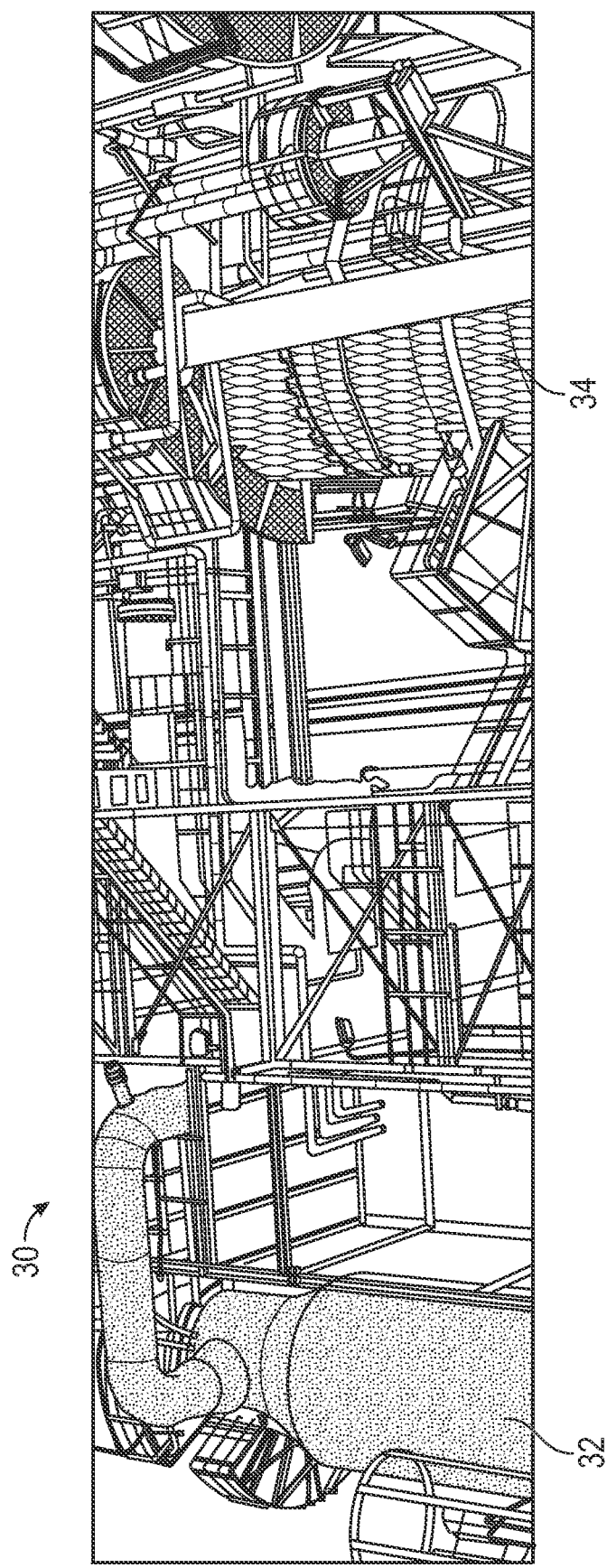
FIG. 3 is an illustration of thermochromatic paint being used to monitor the external surface temperature of equipment.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Continuously and accurately monitoring the surface temperature of fired equipment currently poses many challenges in the field. Oftentimes, there exist unseen, hard to reach areas of the equipment which cannot be visually inspected due to their location, such as the top surface of a vessel. Bad weather causing reduced visibility can also be a hindrance when visual inspection is relied on to monitor equipment. Additionally, visual inspection cannot be used to accurately monitor equipment that is covered by a thermal shroud or a heat shield.

Other methods of temperature monitoring require thermocouples to be welded directly onto the equipment, resulting in potential damage to the integrity of the equipment. Consequently, a thermocouple that is welded onto equipment is difficult to remove for maintenance or repair. Although a thermocouple can provide continuous temperature readings over a selected surface area, only the maximum temperature detected along the thermocouple cord will be reported. Subsequently, the information provided by a thermocouple is limited to only one output—the maximum temperature.

The use of thermochromatic paint requires the shut-down of equipment so that the surface can be prepared prior to painting, and the paint is often irreversible at high temperatures, resulting in further interruption to operations in order to re-paint the equipment. Issues such as these hinder the ability of operators to accurately monitor the surface temperature of fired equipment in real time, thereby increasing the potential for safety hazards, disruption in operations, and financial losses.

Embodiments disclosed herein provide a system and method for monitoring the surface temperature of equipment in real time. The system is reliable, accurate, and continuous, providing full-surface coverage of unseen, hard-to-reach areas, including areas below the shroud. The flexible covering can be easily removed, which simplifies maintenance of the equipment and also allows for the covering to be re-used and repaired as needed. Temperature information can be transmitted in real time to a control module, which can display the information in the form of a heat map and generate an alarm if a temperature threshold has been breached. This allows operators to react to a potential failure and take appropriate action before high temperatures damage the integrity of the equipment surface, resulting in dangerous field conditions. In some embodiments, removeable sensor caps coated with thermochromatic paint can be placed over the sensors of the covering, aiding in visual inspections while being easily repaired or replaced.

Furthermore, the system and method can be adapted to monitor additional properties such as vibration and ambient weather conditions proximate to the equipment being monitored. Wind and ambient temperature can affect heat transfer between air and the equipment, and a low ambient temperature can result in sulfur solidification inside a pipe. To avoid these and other potential issues, the system and method allow for the monitoring of equipment properties as well as properties in the immediate environment surrounding the equipment.

In general, embodiments of the disclosure include a system and method for continuously monitoring the properties of an object and the environment proximate to the object in real time. A flexible covering may be positioned across the external surface of an object to be monitored, such as a vessel or a pipe. Sensors configured to measure one or more properties of the object in real time are disposed at regular intervals across the covering. The sensors are designed to transmit, in real time, property data amongst each other and to a control module, which, in real time, produces a visual representation of the property data onto a display.

In one or more embodiments, non-limiting examples of an object that can be monitored by the system include fired equipment, plant piping, pressure vessels, and pressure tanks. The flexible covering can be constructed of a suitable material for the intended purpose of the object being monitored. By way of example and not limitation, a flexible covering that is applied to fired equipment can be constructed of a material that is resistant to fire and ultraviolet (UV) radiation, such as a ceramic fiber material. Based on the application, a material can be chosen that provides thermal insulation or non-insulation or, alternatively, includes openings allowing for visual inspection of the equipment.

In one or more embodiments, the sensors on the flexible covering may be configured to measure one or more properties of the object which include but are not limited to surface temperature, vibration, and ambient weather conditions around the object such as air temperature, humidity, wind speed, and wind direction.

In some embodiments, a first plurality of sensors measuring a first property can be disposed at regular intervals across the flexible covering, and a second plurality of sensors measuring a second property can be disposed at regular intervals across the flexible covering, such that the first plurality of sensors and the second plurality of sensors are disposed at regular intervals relative to each other across the flexible covering.

Examples of suitable commercially available sensor technology include but are not limited to Emerson Rosemount™ Wireless Permasense, Sensorlink Swarm™, and Ionix Hot-Sense™.

Figure 4:
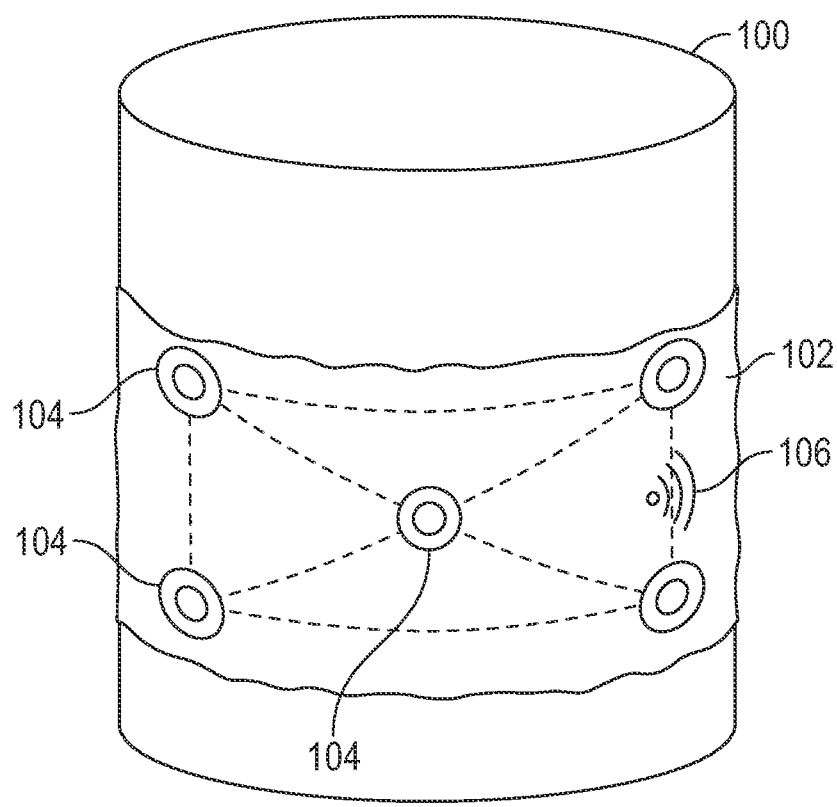
FIG. 4 is an illustration of a vessel covered by a blanket in accordance with one or more embodiments of the present disclosure.

An example of a flexible covering in accordance with one or more embodiments of the present disclosure in shown in FIG. 4. The flexible covering may be in the form of a blanket 102, the blanket 102 being composed of one or more layers of material. The blanket 102 can be applied to the external surface area of equipment that requires monitoring, as depicted on the vessel 100, such that the blanket 102 conforms to the shape of the vessel 100 which it is monitoring.

In one or more embodiments, the flexible covering can be affixed to the equipment by passing cables through channels within the flexible covering and fastening the cables to the bottom or sides of the equipment or to the ground. Another mechanism to affix the flexible covering to the equipment can be to run external strips of metal or other suitable material along the equipment, enabling the covering to remain wrapped tight to the equipment.

The surface area of the equipment being monitored may be too large to be covered by a single flexible covering. Therefore, in some embodiments, one or more flexible coverings may be used in combination to cover the intended equipment surface. Means by which flexible coverings can be attached to each other include, but are not limited to, zippers, buttons, buckles, straps, clasp lockers, and sewed seams.

Continuing with FIG. 4, a plurality of sensors 104 can be distributed in regular intervals across the blanket 102. The sensors 104 can be configured to continuously monitor, in real time, one or more external surface properties of the vessel 100. Additionally, the sensors 104 can share property data relating to the vessel 100 amongst each other.

In one or more embodiments, as shown in FIG. 4, communication of property data between the sensors 104 can be done through wireless transmission 106. Those skilled in the art will readily appreciate various wireless transmission standards are available for use, such as Wi-Fi and Bluetooth.

As discussed previously, the blanket 102 can be composed of one or more layers of material on which the sensors 104 are distributed in regular intervals. FIGS. 5A-5D depict examples of different approaches to installing the sensors 104 into the blanket 102, in one or more embodiments. Note that, in one or more embodiments, the thermal conductivity of the one or more layers of the blanket 102 may be considered when choosing a location on which to install the sensors 104.

Figure 5A:
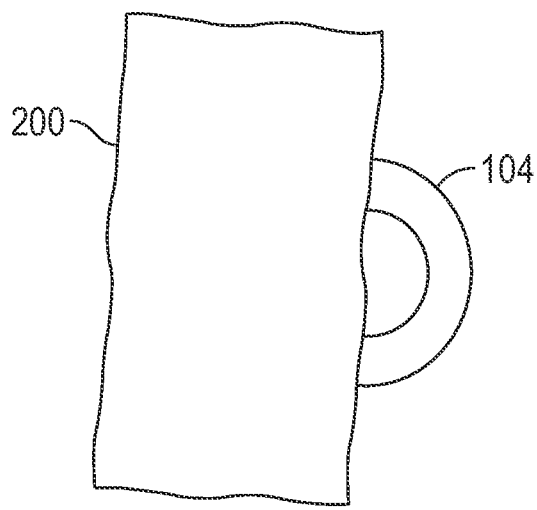
FIGS. 5A-5D illustrate various methods of installing the sensors onto the sensor blanket in accordance with one or more embodiments of the present disclosure.

FIG. 5A shows a sensor 104 installed onto the innermost layer of blanket material 200, such that the sensor 104 is in contact with the surface of the equipment being monitored and is not visible from the external side of the blanket 102.

Figure 5B:
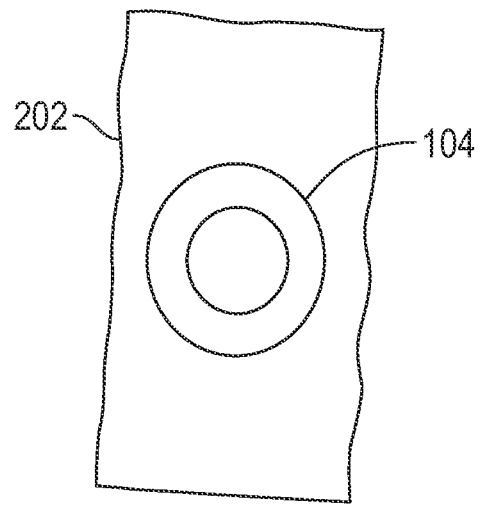

FIG. 5B shows a sensor 104 installed onto the outermost layer of blanket material 202, such that the sensor 104 is not in contact with the surface of the equipment being monitored and is visible from the external side of the blanket 102. In one or more embodiments, the blanket material 202 between the sensor 104 and the equipment can be constructed of a non-insulating material to facilitate the accurate measurement of equipment surface temperature.

Figures 5C, 5D:
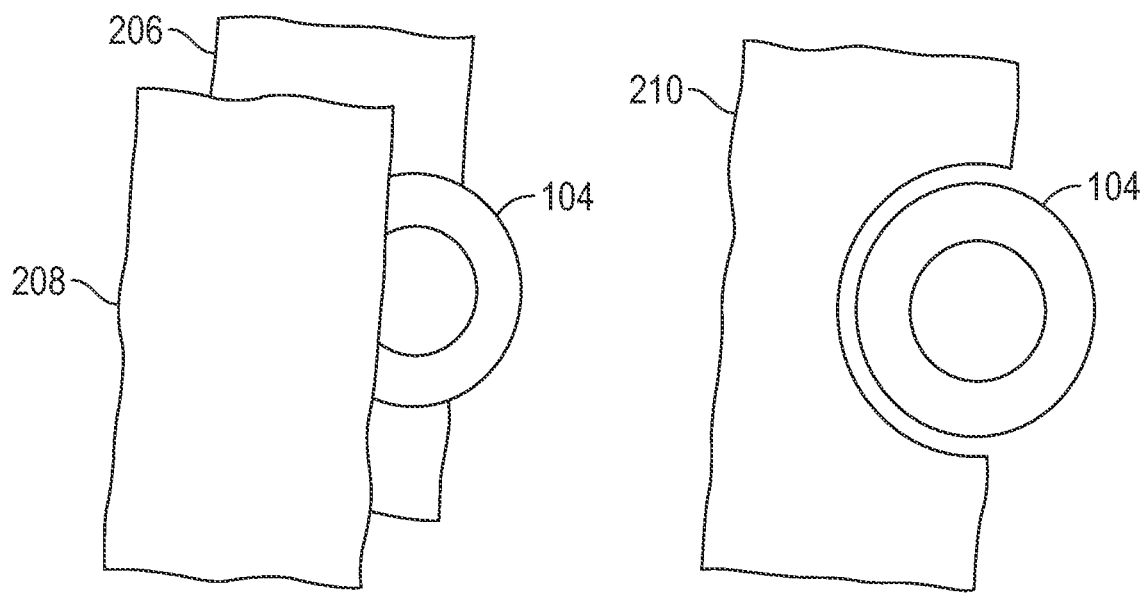

FIG. 5C shows a sensor 104 installed between two layers of blanket material 206 and 208, such that the sensor 104 is neither in contact with the surface of the equipment being monitored nor is visible from the external side of the blanket 102. In one or more embodiments, the blanket material 206 between the sensor 104 and the equipment can be constructed of a non-insulating material to facilitate the accurate measurement of equipment surface temperature.

FIG. 5D shows a sensor 104 installed into the one or more layers of blanket material 210, such that the sensor 104 passes through the layers 210, making contact with the surface of the equipment being monitored while simultaneously being visible from the external side of the blanket 102.

Figure 6:
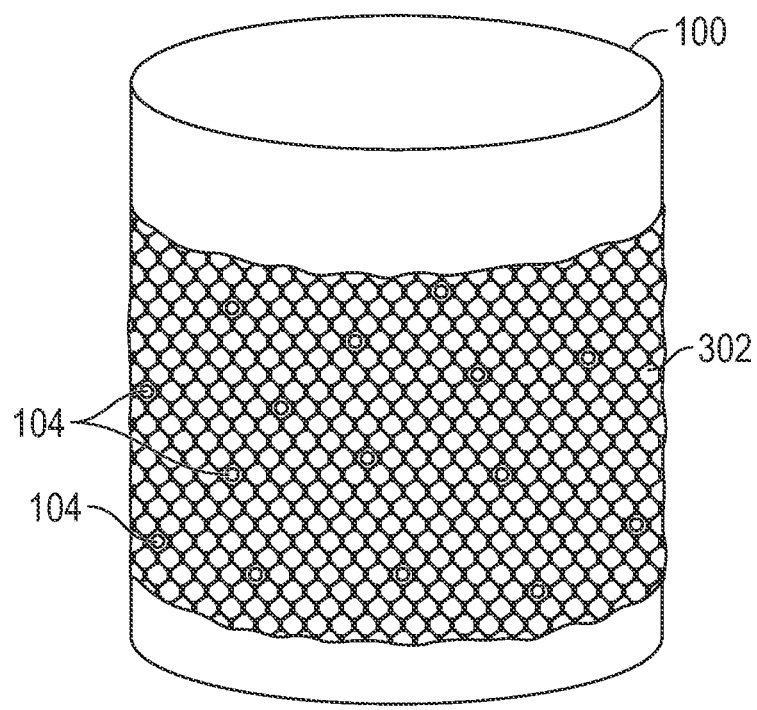
FIG. 6 is an illustration of a vessel covered by a mesh in accordance with one or more embodiments of the present disclosure.

In one or more embodiments, the flexible covering can be in the form of a mesh material 302 as depicted in FIG. 6. Similar to the blanket 102 of FIG. 4, the mesh 302 can be applied to the external surface area of equipment that requires monitoring, as depicted on the vessel 100, such that the mesh 302 conforms to the shape of the vessel 100 which it is monitoring. The sensors 104 can be distributed in regular intervals across the mesh 302.

Mesh material is characterized by open spaces between a screen-like weave. Therefore, in some embodiments, the sensors 104 can be affixed within the open spaces of the mesh 302 such that the sensors 104 are in contact with the equipment surface being monitored, while simultaneously being visible from the external side of the mesh 302. Alternatively, in some embodiments, the sensors can be affixed along the lines of the mesh 302 to provide more ventilation to the equipment. Depending upon the external surface properties being measured by the sensors, a first plurality of sensors can be affixed within open spaces of the mesh 302 while a second plurality of sensors can be affixed along the lines of the mesh 302.

Due to its porous nature, a mesh 302 can provide ventilation while monitoring the vessel 100, ensure accurate monitoring due to the direct contact of sensors 104 with the vessel 100, and allow easy access to the sensors 104 for maintenance and visual monitoring of the equipment.

Figure 7:
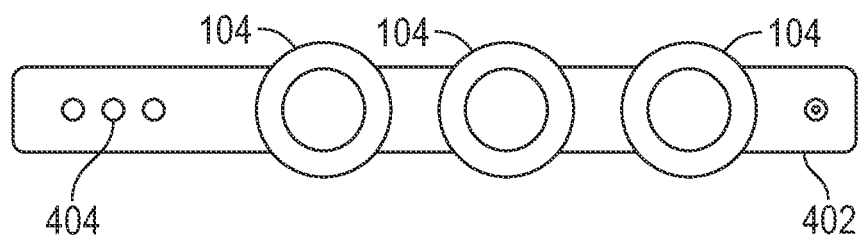
FIG. 7 is an illustration of an adjustable-fit strap in accordance with one or more embodiments of the present disclosure.

In one or more embodiments, the flexible covering can be in the form of a strap 402 as shown in FIG. 7. The strap 402 can be positioned and adjusted to fit around the surface of the equipment to be monitored, such as a pipe. The strap 402 can be easily adjusted or removed through the use of, for example, clasps, clips, hooks, buttons, snaps, fasteners, or other temporary positioning features 404, allowing for convenient portability.

The sensors 104 can be distributed in regular intervals across the external surface of the strap 402. In some embodiments, the sensors 104 can be affixed to the strap 402 such that the sensors 104 pass through the strap 402, making contact with the surface of the equipment being monitored while simultaneously being visible from the external side of the strap 402.

As previously discussed, thermochromatic paint is often used to monitor the temperature of fired equipment. In the case of a temperature spike, the paint color provides a visual indication of the temperature change, allowing operators in the field to quickly identify problem areas.

However, there are disadvantages to applying thermochromatic paint directly to equipment to monitor temperature. Prior to applying the paint, the equipment must be shut down and the surface of the equipment prepared. Also, upon reaching a temperature threshold which necessitates a color change, many thermochromatic paints are irreversible and require a repeat of the entire application process once triggered.

In some embodiments, one or more sensors on a flexible covering can be equipped with one or more sensor caps by overlaying the external surface of the sensor with the sensor cap. The surface of the sensor cap can be coated with a thermochromatic paint which, when in contact with the surface of monitored equipment, can react to temperature changes by changing color to aid in the visual monitoring of equipment.

Unlike the application of paint directly onto the surface of equipment, as previously described, a sensor cap can be easily equipped and removed from a sensor affixed to a flexible covering as needed. There is no need to shut down equipment or prepare the equipment surface. Additionally, if the paint on the sensor cap reacts to an extreme temperature spike and becomes irreversible, the sensor cap can be quickly and easily replaced. This ease of use facilitates the maintenance of both the sensor and the sensor cap and allows for the continuous monitoring of equipment without operation interruptions.

Figure 8:
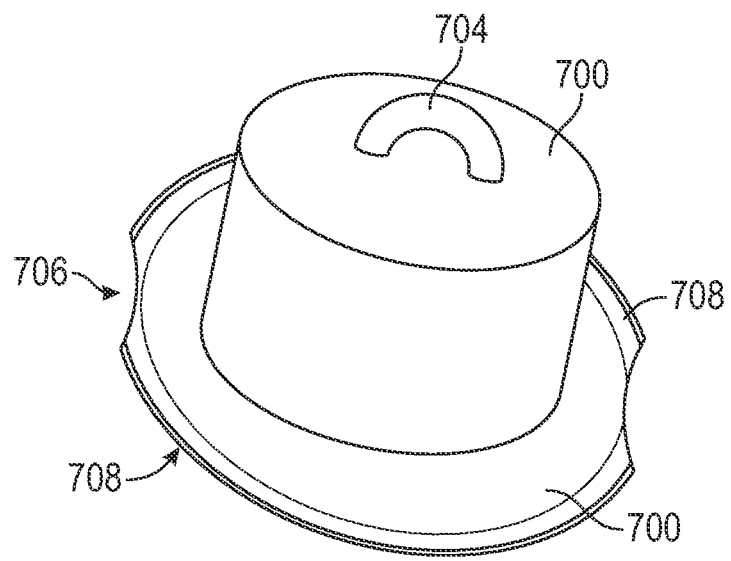
FIG. 8 is an illustration of a sensor cap and sensor in accordance with one or more embodiments of the present disclosure.
Figure 8:
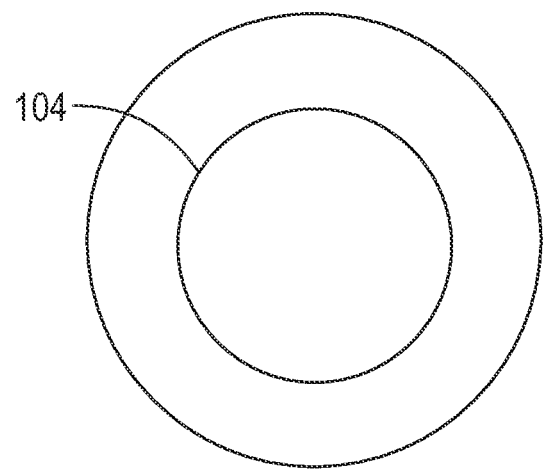

FIG. 8 depicts a sensor cap 700 and sensor 104, in one or more embodiments. The sensor cap attachment element 708 can be used to affix the sensor cap 700 over the external surface of a sensor 104. To facilitate the installation and removal of the sensor cap 700, a sensor cap grip element 704 (e.g., a loop or hook) can be supplied on the external surface of the sensor cap 700. Two grooves 706 on either side of the sensor cap 700 can also be used to aid in the removal of sensor cap 700 from a sensor 104. The surface of sensor cap 700 is coated in a thermochromatic paint.

In one or more embodiments, non-limiting examples of the sensor cap attachment element 708 include a clip, a snap, a clasp, or other suitable fastening mechanism. As shown in FIG. 8, the circumference of the sensor cap attachment element 708 may be greater than the portion of the sensor cap 700 that overlays the sensor 104.

Figure 9A:
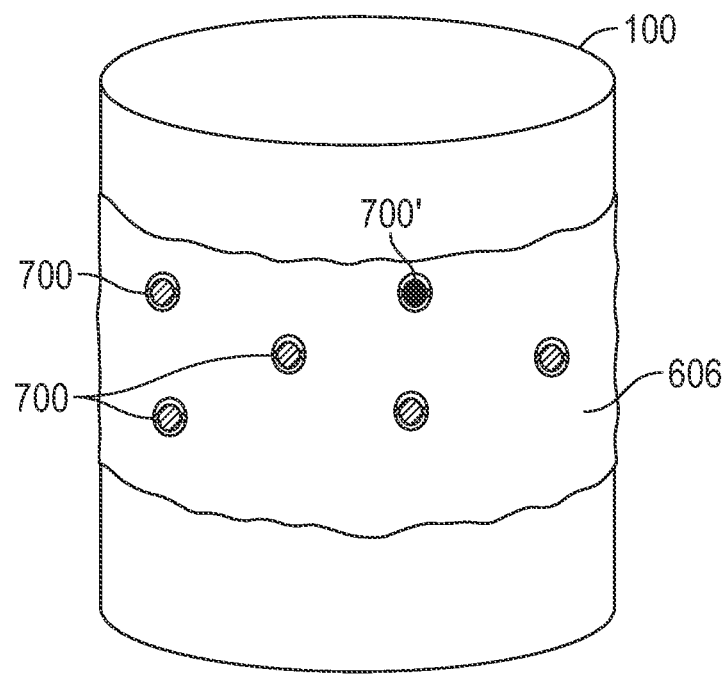
FIGS. 9A-9B illustrate sensors equipped with sensor caps in accordance with one or more embodiments of the present disclosure.

FIG. 9A shows an embodiment of a blanket 606 monitoring a vessel 100. The sensors 104 have been installed onto blanket 606 in the manner as shown in FIG. 5D, such that the sensors 104 pass through the blanket 606, making contact with the surface of the vessel 100 while simultaneously being visible from the external side of the blanket 606. The sensors 104 have been equipped with sensor caps 700 that are coated with thermochromatic paint, in accordance with one or more embodiments. Sensor caps 700 are configured to overlay the external surface of the sensors 104 on the blanket 606. Once equipped onto the sensors 104 of blanket 606 and in contact with the surface of vessel 100, the thermochromatic paint coating the sensor caps 700 can react to temperature changes to aid in visually monitoring the surface temperature of the vessel 100.

In FIG. 9A, sensor caps 700 are shown monitoring an area of stable temperature on the vessel 100. Sensor cap 700' represents a sensor cap reacting to an area of the vessel 100 that is experiencing a temperature spike, resulting in the color of the thermochromatic paint on sensor cap 700' to change.

Figure 9B:
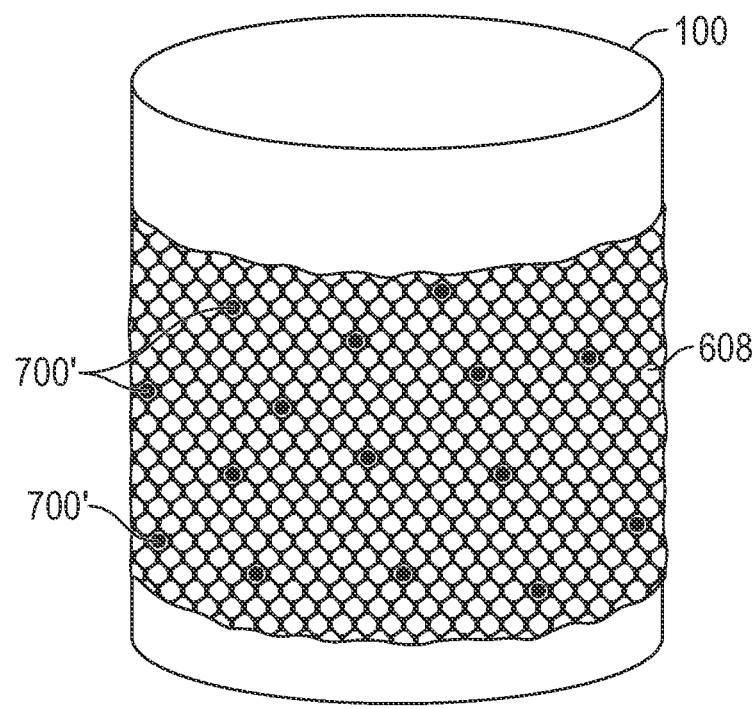

FIG. 9B shows an embodiment of a mesh 608 monitoring a vessel 100. The sensors 104 installed in mesh 608 have been equipped with sensor caps 700 that are coated with thermochromatic paint, in accordance with one or more embodiments. In FIG. 9B, sensor caps 700' represent sensor caps with thermochromatic paint that have changed color, indicating that the entire visible area of the vessel 100 is experiencing a temperature spike.

In one or more embodiments, the plurality of sensors in the flexible covering can transmit property data to a control module in real time. The property data can relate to the external surface of the equipment being monitored, examples of which include, but are not limited to, temperature and vibration. Additionally, the property data can relate to the ambient weather surrounding the equipment being monitored, examples of which include, but are not limited to, ambient temperature, humidity, wind speed, and wind direction.

In one or more embodiments, the sensors can transmit property data to a control module through wireless transmission. As an alternative, in one or more embodiments, the sensors can transmit property data to a transceiver, which transmits the property data onto the control module. In some embodiments, the sensors can be wired to the transceiver, which wirelessly transmits the property data onto the control module. In some embodiments, the sensors can wirelessly transmit the property data to the transceiver, which wirelessly transmits the property data onto the control module. Those skilled in the art will readily appreciate various wireless transmission standards are available for use, such as Wi-Fi and Bluetooth.

Using the property data received from each individual sensor of the flexible covering, the control module can be configured to interpolate an estimation of measurements in the areas on the equipment between the sensors. Consequently, in one or more embodiments, the control module can produce a full surface visual representation of the property data onto a display. Examples of a display can include, but are not limited to, a liquid crystal display (LCD), a plasma display, touchscreen, cathode ray tube (CRT) monitor, projector, or a mobile device.

In one or more embodiments, the control module can produce the visual representation of the property data onto a digital representation of the physical object being monitored, otherwise known as a digital twin, which is then shown on the display. Digital Twin Systems use sensors, such as those found in the flexible covering, to model real-world objects onto a virtual counterpart of the object. The sensors can operate in real time to continuously update the digital twin, via the control module, with property data, allowing for accurate and efficient visual monitoring of equipment.

In one or more embodiments, the control module can produce the visual representation of the property data in the form of a heat map, which is then shown on the display. The control module can produce the heat map onto a digital twin of the object being monitored, in one or more embodiments.

To facilitate the continuous monitoring of equipment, in one or more embodiments, the control module can generate a visual alert on the display based on the property data that was obtained from the sensors. The control module can be configured to monitor the property data in real time and continuously compare the property data with a pre-determined threshold.

The pre-determined threshold can be one or more measurements of the same unit as the property data, for example a temperature, which, when breached, could indicate a potential failure if detected on the surface of equipment. When the control module detects property data that has breached a pre-determined threshold, a visual alert can be generated by the control module and shown on the display. In some embodiments, including but not limited to those using a digital twin and/or a heat map, the physical location of the sensor that triggered the visual alert can be indicated on the visual representation of the property data to aid in the discovery of the potential failure. The presence of a visual alert can serve as a warning that a potential equipment failure has been detected and that action should be taken to prevent the failure.

Figure 10:
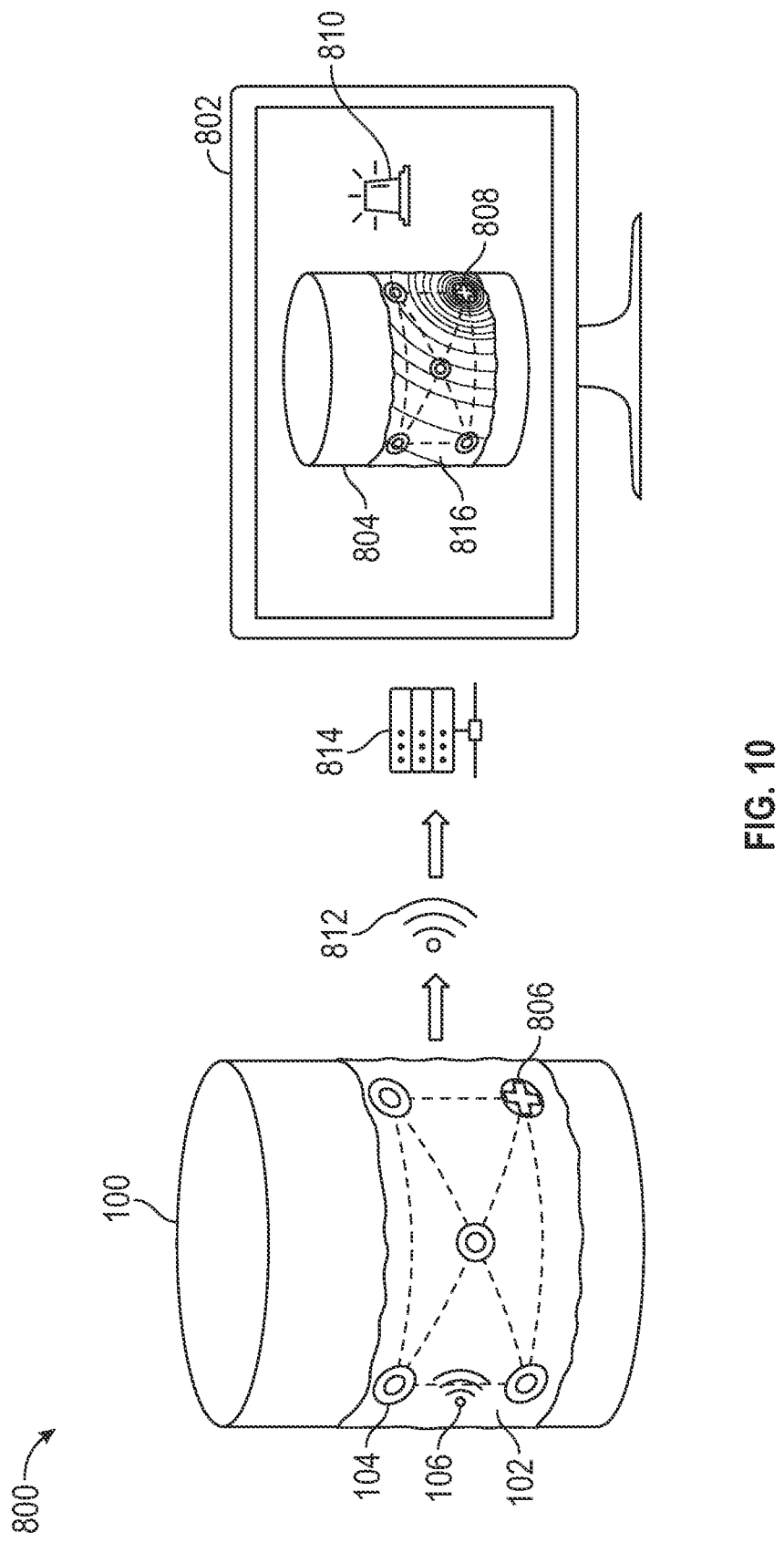
FIG. 10 is an illustration of the system in accordance with one or more embodiments of the present disclosure.

FIG. 10 shows an example of the system 800, in one or more embodiments. A flexible covering in the form of a blanket 102 can be applied to the external surface area of equipment that requires monitoring, as depicted on the vessel 100. A plurality of sensors 104 can be distributed in regular intervals across the blanket 102. The sensors 104 can be configured to continuously monitor, in real time, one or more properties of the vessel 100.

Additionally, the sensors 104 can transmit property data relating to the vessel 100 amongst each other in real time. In one or more embodiments, as shown in FIG. 10, communication of property data between the sensors 104 can be done through wireless transmission 106.

Sensors 104 within the blanket 102 can also transmit property data to a control module 814 in real time. In one or more embodiments, as shown in FIG. 10, the sensors 104 can transmit property data to a control module through wireless transmission 812. Since the sensors 104 can transmit property data amongst each other, sensors 104 that may be unreachable by the control module 814 can still provide property data to the control module 814.

Using the property data received from each sensor 104 within the blanket 102, the control module 814 can produce a full surface visual representation 804 of the property data onto a display 802. In one or more embodiments, the visual representation of the property data can be in the form of a heat map 816, as shown in FIG. 10.

In one or more embodiments, the control module 814 can detect when property data transmitted by the sensors 104 have breached a pre-determined threshold. When a breach occurs, such as shown on sensor 806, a visual alert 810 can be generated by the control module 814 and shown on the display 802. In some embodiments, the physical location 808 of the sensor 806 that triggered the visual alert 810 can be indicated on the visual representation 804 of the property data to aid in the discovery of the potential failure.

Figure 11:
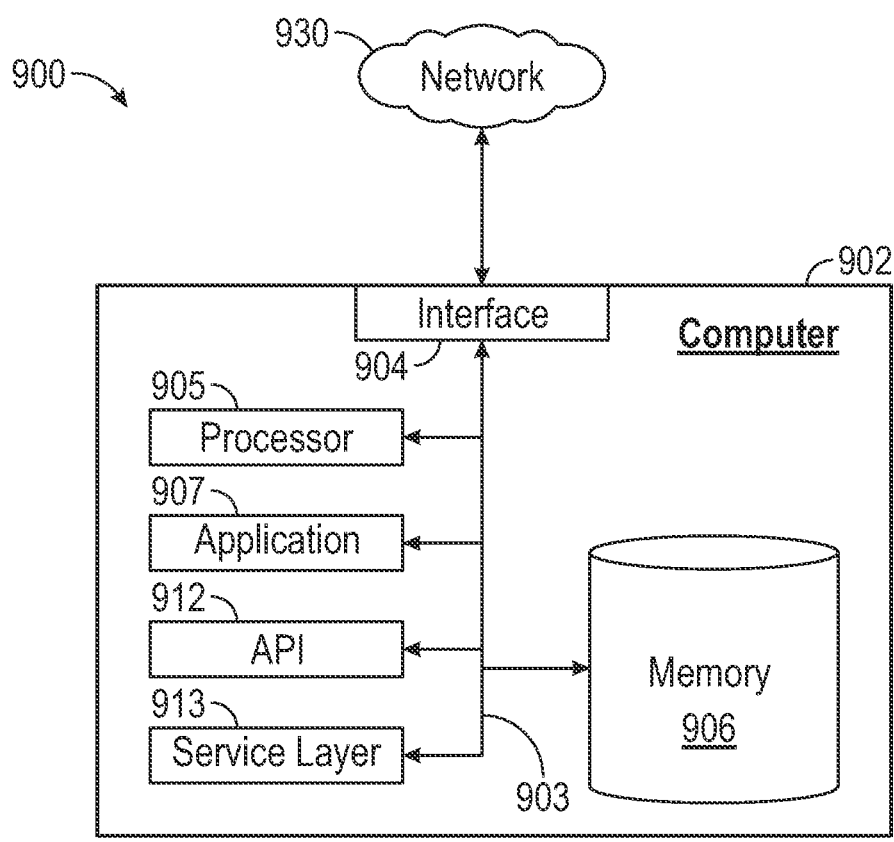
FIG. 11 shows a computing system in accordance with one or more embodiments of the present disclosure.

In one or more embodiments, the control module can be a computer system that is similar to the computer system depicted in FIG. 11 and the accompanying description.

Embodiments of the control module may be implemented on a computer system. FIG. 11 is a block diagram of a computer system 900 used to provide computational functionalities associated with described algorithms, methods, functions, processes, flows, and procedures as described in the instant disclosure, according to an implementation. The illustrated computer 902 is intended to encompass any computing device such as a high-performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 902 may include a computer that includes an input device, such as a keypad, keyboard, touch screen, or other device that can accept user information, and an output device that conveys information associated with the operation of the computer 902, including digital data, visual, or audio information (or a combination of information), or a GUI.

The computer 902 can serve in a role as a client, network component, a server, a database or other persistency, or any other component (or a combination of roles) of a computer system for performing the subject matter described in the instant disclosure. The illustrated computer 902 is communicably coupled with a network 930. In some implementations, one or more components of the computer 902 may be configured to operate within environments, including cloud-computing-based, local, global, or other environment (or a combination of environments).

At a high level, the computer 902 is an electronic computing device operable to receive, transmit, process, store, or manage data and information associated with the described subject matter. According to some implementations, the computer 902 may also include or be communicably coupled with an application server, e-mail server, web server, caching server, streaming data server, business intelligence (BI) server, or other server (or a combination of servers).

The computer 902 can receive requests over network 930 from a client application (for example, executing on another computer 902) and responding to the received requests by processing the said requests in an appropriate software application. In addition, requests may also be sent to the computer 902 from internal users (for example, from a command console or by other appropriate access method), external or third-parties, other automated applications, as well as any other appropriate entities, individuals, systems, or computers.

Each of the components of the computer 902 can communicate using a system bus 903. In some implementations, any or all of the components of the computer 902, both hardware or software (or a combination of hardware and software), may interface with each other or the interface 904 (or a combination of both) over the system bus 903 using an application programming interface (API) 912 or a service layer 913 (or a combination of the API 912 and service layer 913. The API 912 may include specifications for routines, data structures, and object classes. The API 912 may be either computer-language independent or dependent and refer to a complete interface, a single function, or even a set of APIs. The service layer 913 provides software services to the computer 902 or other components (whether or not illustrated) that are communicably coupled to the computer 902. The functionality of the computer 902 may be accessible for all service consumers using this service layer. Software services, such as those provided by the service layer 913, provide reusable, defined business functionalities through a defined interface. For example, the interface may be software written in JAVA, C++, or other suitable language providing data in extensible markup language (XML) format or other suitable format. While illustrated as an integrated component of the computer 902, alternative implementations may illustrate the API 912 or the service layer 913 as stand-alone components in relation to other components of the computer 902 or other components (whether or not illustrated) that are communicably coupled to the computer 902. Moreover, any or all parts of the API 912 or the service layer 913 may be implemented as child or sub-modules of another software module, enterprise application, or hardware module without departing from the scope of this disclosure.

The computer 902 includes an interface 904. Although illustrated as a single interface 904 in FIG. 11, two or more interfaces 904 may be used according to particular needs, desires, or particular implementations of the computer 902. The interface 904 is used by the computer 902 for communicating with other systems in a distributed environment that are connected to the network 930. Generally, the interface 904 includes logic encoded in software or hardware (or a combination of software and hardware) and operable to communicate with the network 930. More specifically, the interface 904 may include software supporting one or more communication protocols associated with communications such that the network 930 or interface's hardware is operable to communicate physical signals within and outside of the illustrated computer 902.

The computer 902 includes at least one computer processor 905. Although illustrated as a single computer processor 905 in FIG. 11, two or more processors may be used according to particular needs, desires, or particular implementations of the computer 902. Generally, the computer processor 905 executes instructions and manipulates data to perform the operations of the computer 902 and any algorithms, methods, functions, processes, flows, and procedures as described in the instant disclosure.

The computer 902 also includes a memory 906 that holds data for the computer 902 or other components (or a combination of both) that can be connected to the network 930. For example, memory 906 can be a database storing data consistent with this disclosure. Although illustrated as a single memory 906 in FIG. 11, two or more memories may be used according to particular needs, desires, or particular implementations of the computer 902 and the described functionality. While memory 906 is illustrated as an integral component of the computer 902, in alternative implementations, memory 906 can be external to the computer 902.

The application 907 is an algorithmic software engine providing functionality according to particular needs, desires, or particular implementations of the computer 902, particularly with respect to functionality described in this disclosure. For example, the application 907 can serve as one or more components, modules, applications, etc. Further, although illustrated as a single application 907, the application 907 may be implemented as multiple applications 907 on the computer 902. In addition, although illustrated as integral to the computer 902, in alternative implementations, the application 907 can be external to the computer 902.

There may be any number of computers 902 associated with, or external to, a computer system containing computer 902, each computer 902 communicating over network 930. Further, the term "client," "user," and other appropriate terminology may be used interchangeably as appropriate without departing from the scope of this disclosure. Moreover, this disclosure contemplates that many users may use one computer 902, or that one user may use multiple computers 902.

In some embodiments, the computer 902 is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a seismic trace" includes reference to one or more of such traces.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although multiple dependent claims are not introduced, it would be apparent to one of ordinary skill that the subject matter of the dependent claims of one or more embodiments may be combined with other dependent claims.

Although only a few example embodiments have been described in detail previously, those skilled in the art will readily appreciate that many modifications are possible in the example embodiments without materially departing from this invention. Accordingly, all such modifications are intended to be included within the scope of this disclosure as defined in the following claims.

What is claimed is:

1. A system for monitoring properties of an object and an environment proximate to the object, comprising:
    a flexible covering configured to conform to one or more surfaces of the object;
    a plurality of sensors disposed at regular intervals across the flexible covering, wherein each of the sensors is configured to measure, in real time, one or more properties, and wherein the sensors are configured to transmit property data amongst each other;
    one or more sensor caps configured to overlay a surface of each of the plurality of sensors, wherein each sensor cap is removable and coated with a thermochromatic paint;
    a control module configured to receive, in real time, the property data from each of the plurality of sensors, wherein the control module comprises a processor and a non-transitory computer-readable medium having executable instructions encoded thereon such that, when executed, cause the processor to produce, in real time, a visual representation of the property data; and
    a display configured to show, in real time, the visual representation of the property data.

2. The system of claim 1, wherein the flexible covering is comprised of a mesh material.

3. The system of claim 1, wherein the flexible covering is a blanket comprised of one or more layers, and wherein the plurality of sensors are disposed onto an innermost layer in contact with the one or more surfaces of the object.

4. The system of claim 1, wherein the flexible covering is a blanket comprised of one or more layers, and wherein the plurality of sensors are disposed onto an outermost layer such that the plurality of sensors are not in contact with the one or more surfaces of the object.

5. The system of claim 1, wherein the flexible covering is a blanket comprised of one or more layers, and wherein the plurality of sensors are configured to pass through the one or more layers.

6. The system of claim 1, wherein the flexible covering is a blanket comprised of a plurality of layers, and wherein the plurality of sensors are encased between the plurality of layers.

7. The system of claim 1, wherein the flexible covering is a strap configured to fasten around a circumference of the object.

8. The system of claim 1, wherein the one or more properties comprises at least one of surface temperature, vibration, ambient temperature, humidity, wind speed, and wind direction.

9. The system of claim 1, wherein each of the plurality of sensors is configured to transmit wirelessly with one or more other sensors in the plurality of sensors.

10. The system of claim 1, wherein the plurality of sensors are configured to transmit wirelessly with the control module.

11. The system of claim 1, wherein the control module is configured to generate a visual alert on the display related to the property data obtained from at least one sensor in the plurality of sensors, wherein the visual alert indicates a position of the at least one sensor on the visual representation.

12. The system of claim 1, wherein the visual representation comprises a heat map.

13. A method for monitoring properties of an object and an environment proximate to the object, comprising:
    disposing a plurality of sensors at regular intervals across a flexible covering, wherein each of the sensors is configured to measure, in real time, one or more properties, and wherein the sensors are configured to transmit property data amongst each other;
    overlaying a surface of each of the plurality of sensors with one or more sensor caps, wherein each sensor cap is removable and coated with a thermochromatic paint;
    positioning the flexible covering on the object, wherein the flexible covering is configured to conform to one or more surfaces of the object;

receiving, by a control module comprising a processor, the property data, in real time, from each of the plurality of sensors;

producing, in real time, a visual representation of the property data; and displaying, in real time, the visual representation of the property data.

14. The method of claim 13, wherein the one or more properties comprises at least one of surface temperature, vibration, ambient temperature, humidity, wind speed, and wind direction.

15. The method of claim 13, wherein each of the plurality of sensors is configured to transmit wirelessly with one or more other sensors in the plurality of sensors.

16. The method of claim 13, wherein the plurality of sensors are configured to transmit wirelessly with the control module.

17. The method of claim 13, further comprising:

generating, by the control module, a visual alert on the display related to the property data obtained from at least one sensor in the plurality of sensors, wherein the visual alert indicates a position of the at least one sensor on the visual representation.

18. The method of claim 13, wherein the visual representation comprises a heat map.

\* \* \* \* \*